United States Patent [19]

Etzbach et al.

[11] Patent Number: 5,384,378

[45] Date of Patent: Jan. 24, 1995

[54] COPOLYMERS WITH NON-LINEAR OPTICAL PROPERTIES AND THE USE THEREOF

[75] Inventors: Karl-Heinz Etzbach, Frankenthal; Stefan Beckmann, Mannheim; Oskar Nuyken, Munich; Peter Strohriegl, Hummeltal; Harry Mueller, Muenchberg, all of Germany

[73] Assignee: BASF Aktiengesellschaft, Ludwigshafen, Germany

[21] Appl. No.: 124,050

[22] Filed: Sep. 21, 1993

[30] Foreign Application Priority Data

Sep. 26, 1992 [DE] Germany ............................ 4232394

[51] Int. Cl.$^6$ .......................................... C08F 270/02
[52] U.S. Cl. .................... 526/256; 526/282; 526/312; 526/311; 526/298; 526/284; 526/287; 526/313; 526/273; 526/315
[58] Field of Search ................ 526/282, 298, 311, 312, 526/313, 256, 284, 273

[56] References Cited

U.S. PATENT DOCUMENTS

| 3,639,362 | 2/1972 | Duling et al. | 526/282 |
| 4,894,263 | 1/1990 | Dubois et al. | 428/1 |
| 5,155,195 | 10/1992 | Feuer | 526/243 |
| 5,231,140 | 7/1993 | Kilbury et al. | 525/274 |

FOREIGN PATENT DOCUMENTS

| 312856 | 4/1989 | European Pat. Off. . |
| 334176 | 9/1989 | European Pat. Off. . |
| 337405 | 10/1989 | European Pat. Off. . |
| 396172 | 11/1990 | European Pat. Off. . |
| 8805790 | 11/1989 | France . |
| 91/03683 | 3/1991 | WIPO . |

OTHER PUBLICATIONS

Yamaguchi et al., Polymer Bulletin, 25, pp. 597–602 (1991).
Robello, J. Polvm. Sci.; Part A, Linear Polymers of Nonlinear . . . M. Amano, T. Kanio, Electron. Lett. 26 1990, 981.
Developments of Optically Nonlinear Polymers and Devices Mohlmann, Synthetic Metals, 37 (1990), 207.
Introduction to Nonlinear Optical Effects In Molecules and Polymers, Prasad et al., J. Wiley and Sons, N.Y. 1991.

*Primary Examiner*—Mark Nagumo
*Attorney, Agent, or Firm*—Keil & Weinkauf

[57] ABSTRACT

Copolymers with non-linear optical properties, which contain or are composed of repeating units of the formula (I)

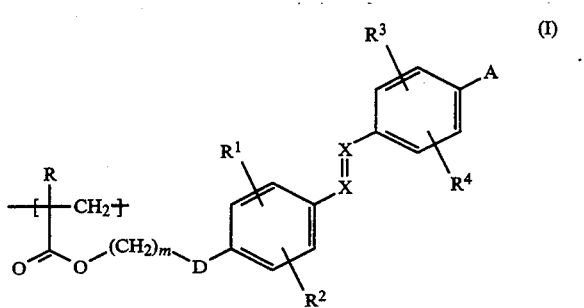

where
  D is an electron donor,
  A is an electron acceptor,
  $R^1$, $R^2$, $R^3$ and $R^4$ can be the same as or different from one another, and are each H, alkyl, cycloalkyl, or $R^3$ and $R^4$ are each CN, $NO_2$ or CHO, or $R^1$ forms with $R^2$, or $R_3$ forms with $R^4$, a fused-on ring,
  X is CH and/or N,
  m is an integer from 2 to 11, and
  R is hydrogen or methyl, and repeating units of at least one of the formulae (II), (III) and (IV)

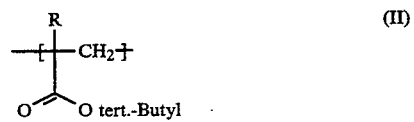

(Abstract continued on next page.)

-continued
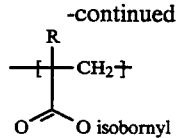
(III)
-continued
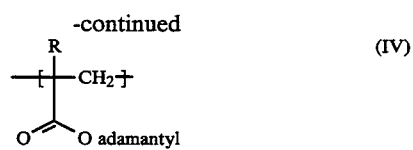
(IV)
are suitable for the production of optical components.
8 Claims, No Drawings

COPOLYMERS WITH NON-LINEAR OPTICAL PROPERTIES AND THE USE THEREOF

The present invention relates to copolymers with non-linear optical properties and to the use thereof in optical components, especially in communications technology.

Polymers with lateral non-linear optical chromophores and the preparation thereof by free-radical initiated polymerization of ethylenically unsaturated organic compounds (methacrylic and acrylic compounds) which carry non-linear optical (=NLO) chromophores as side groups have been described, for example, by D. R. Robello in J. Polym. Sci.; Part A: Polymer Chemistry 28 (1990) 1, M. Amano, T. Kaino, Electron. Lett. 26 (1990) 981 and G. R. Möhlmann, Synthetic Metals, 37 (1990) 207, and in EP-A 0337405, EP-A 0334176, EP-A 0396172, FR-A 2630744 and FR-A 2597109.

German Patent Application P 4116594.2 has, moreover, proposed a process for preparing (meth)acrylate polymers with lateral non-linear optical chromophores by reacting polymers of (meth)acryloyl chloride with D-ω-hydroxyalkyl chromophores. In order for such polymers to acquire NLO activity and have a high second order susceptibility, the side groups must be oriented in an electrical field (cf. P. N. Prasad, D. J. Williams, "Introduction to Nonlinear Optical Effects in Molecules and Polymers", J. Wiley and Sons, New York 1991). This normally takes place in the region of the glass transition temperature, when the side groups are very mobile. The orientation achieved in the field is then frozen in by cooling. One disadvantage of these polymers is that the relaxation of the oriented side groups is too fast. This relaxation is still preventing the production of optical components with long-term stability.

It is an object of the present invention to indicate copolymers with non-linear optical properties by which a prevention or slowing down of the relaxation after orientation is achieved.

We have found that this object is achieved by the copolymers with non-linear optical side groups additionally containing tert-butyl, isobornyl or, in particular, adamantyl (meth)acrylate units.

The present invention relates to copolymers with non-linear optical properties, which contain or are composed of repeating units of the formula (I)

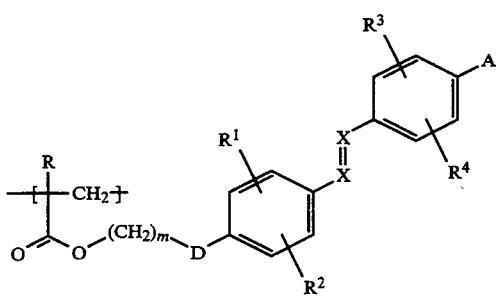

where
D is an electron donor,
A is an electron acceptor,
$R^1$, $R^2$, $R^3$ and $R^4$ can be the same as or different from one another, and are each H, alkyl of 1–6 carbons, cycloalkyl of 5 or 6 carbons, or $R^3$ and $R^4$ are each CN, $NO_2$, $SO_3CH_3$ or CHO, or $R^1$ forms with $R^2$, or $R^3$ forms with $R^4$, a fused-on ring,
X is CH and/or N,
m is an integer from 2 to 11, and
R is hydrogen or methyl,
and repeating units of at least one of the formulae (II), (III) and (IV)

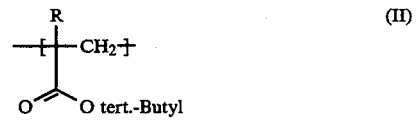

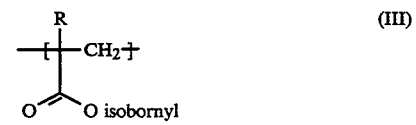

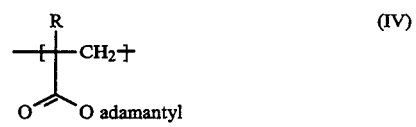

Preferred copolymers according to the invention are also those in which in the formula (I)
D is $NR^5$ or O
—X=X— is —N=N—, —N=CH—, —CH=N— or —CH=CH—
A is H, $NO_2$, CN, CHO, $SO_3CH_3$,

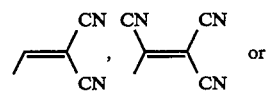

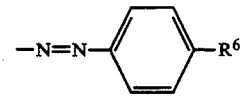

$R^5$ is $C_1$–$C_6$-alkyl or -alkenyl, $C_5$–$C_7$ -cycloalkyl, phenyl, benzyl, tolyl or a crosslinkable group and $R^6$ is H, $NO_2$, CN, $SO_3CH_3$ or CHO, it being possible for these copolymers to contain as crosslinkable group $R^5$ a vinyl, methallyl, allyl, acryl, methacryl, —$(CH_2)_n$—O—CO—CH=$C_2$, —$(CH_2)_n$—O—CO—C($C_3$)=$CH_2$ with n=1 to 8, oxiranyl or thiiranyl group.

It is additionally possible for the copolymers according to the invention, besides the repeating units of the formulae (I) to (IV), to contain at least one other (meth)acrylate unit which is different from those of the formulae (I) to (IV) and may contain crosslinkable groups.

The copolymers according to the invention are preferably composed of 5–80 mol % of units of the formula (I) and of 20–95 mol % of units of the formulae (II), (III) or (IV).

The present invention also relates to the use of the copolymers with non-linear optical properties according to the invention in optical components, and to the use of these optical components in communications technology.

The copolymers according to the invention display not only high glass transition temperatures but also the required slowing down or prevention of the relaxation after orientation in an electrical field.

The following details are given of the copolymers according to the invention, the preparation and use thereof.

The copolymers according to the invention can be prepared in a conventional way by free-radical copolymerization of the monomers, i.e. of the monomers with side groups with NLO activity on the one hand, and tert-butyl, isobornyl or, in particular, adamantyl (meth-)acrylate on the other hand, in suitable solvents such as aromatic hydrocarbons, e.g. toluene or xylene, aromatic halohydrocarbons, e.g. chlorobenzene, ethers, e.g. tetrahydrofuran and dioxane, and/or ketones, e.g. acetone and cyclohexanone, in the presence of conventional free-radical polymerization initiators, e.g. azodiisobutyronitrile or benzoyl peroxide, at elevated temperatures, for example from 30° to 130° C., preferably from 40° to 70° C., with exclusion of water and air, and can be purified by precipitation or reprecipitation of the resulting copolymer solutions, for example in methanol or in chloroform/methanol.

Particularly suitable monomers with side groups with NLO activity are those of the formula

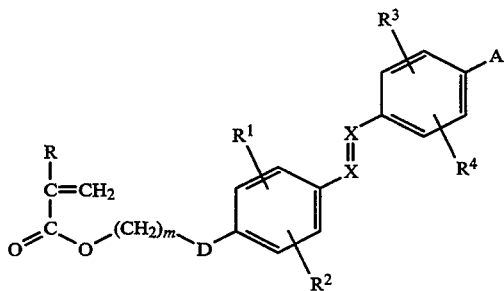

where D, A, $R^1$ to $R^4$, X, m and R have the abovementioned meanings, i.e. esters of acrylic and, in particular, methacrylic acid with groups of the abovementioned type with NLO activity, where D is oxygen or $NR^5$, m is an integer from 2 to 11, preferably 2 to 8, for example 2, 4 or 6, $R^5$ is alkyl of 1–6 carbons, for example methyl, ethyl, butyl or hexyl, $C_2$–$C_6$-alkenyl, e.g. allyl or hexenyl, cycloalkyl of 5–7 carbons, e.g. cyclohexyl, phenyl, benzyl, tolyl or a crosslinkable group such as a vinyl, allyl, methallyl, acryl, methacryl, —($CH_2$)$_n$—O—CO—CH=$CH_2$, —($CH_2$)$_n$—O—CO—C($CH_3$)=$CH_2$ with n=1 to 8, oxiranyl or thiiranyl group, for example

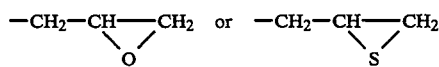

and groups derived from cinnamic acid, styrene, maleimide or cyclopropene;

A in the formula (I) can be hydrogen, $NO_2$, CN, CHO, $SO_3CH_3$ or

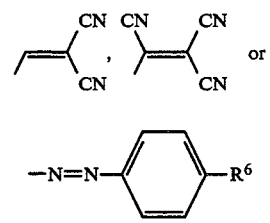

where $R^6$ is H, $NO_2$, CN, $SO_3CH_3$ or CHO.

$R^1$, $R^2$, $R^3$ and $R^4$ in the formula (I) can be hydrogen, alkyl of 1–6 carbons, for example methyl, ethyl, isopropyl, n-butyl, isobutyl or hexyl, cycloalkyl of 5 or 6 carbons such as cyclohexyl, or $R^1$ can form with $R^2$, or $R^3$ can form with $R^4$, a fused-on ring, e.g. naphthyl.

Examples of such monomers with groups with NLO activity are:

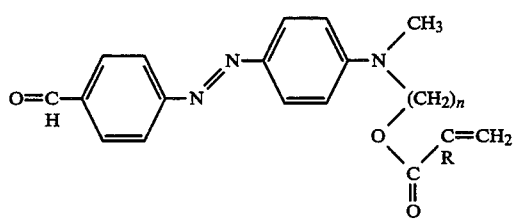

n = 6;  R = $CH_3$

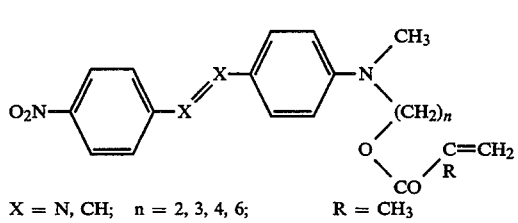

X = N, CH;  n = 2, 3, 4, 6;  R = $CH_3$

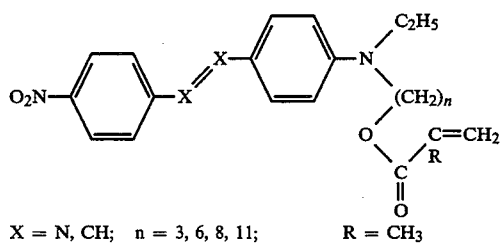

X = N, CH;  n = 3, 6, 8, 11;  R = $CH_3$

-continued

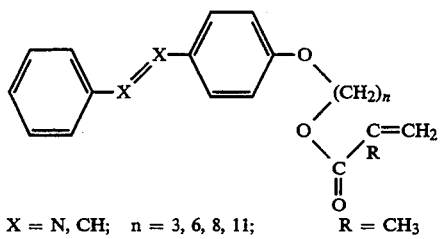

X = N, CH;  n = 3, 6, 8, 11;       R = CH₃

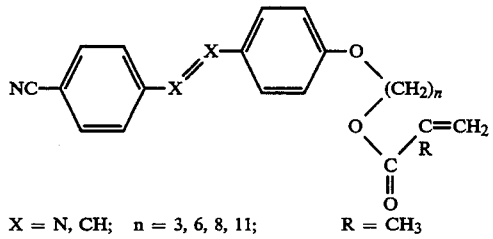

X = N, CH;  n = 3, 6, 8, 11;       R = CH₃

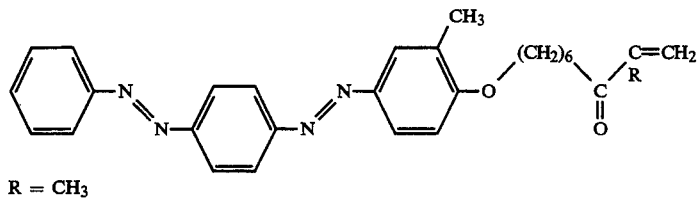

R = CH₃

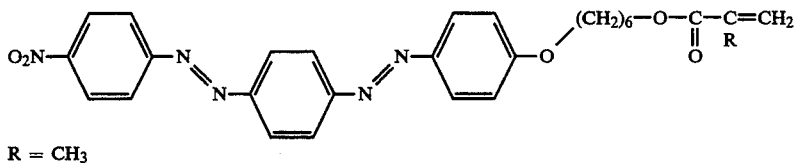

R = CH₃

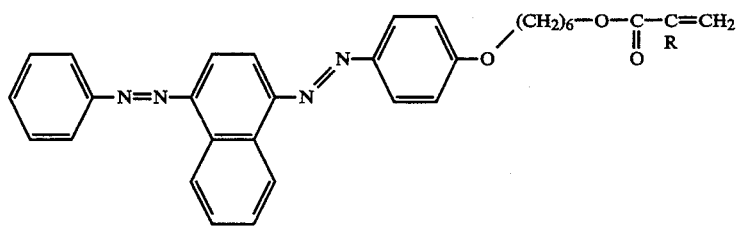

R = CH₃

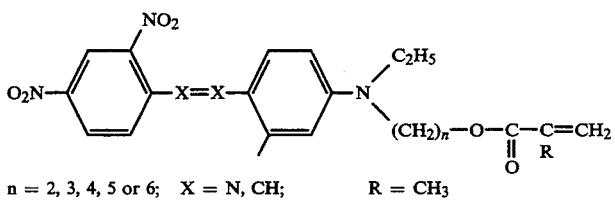

n = 2, 3, 4, 5 or 6;  X = N, CH;       R = CH₃

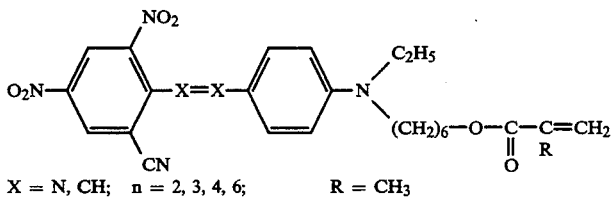

X = N, CH;  n = 2, 3, 4, 6;       R = CH₃

Besides the repeating units of the formula (I), the copolymers with non-linear optical properties according to the invention contain repeating units of the formulae (II), (III) or (IV), preferably tert-butyl, isobornyl or adamantyl methacrylate, and they contain 5–80, in particular 10–70, mol % of units of the formula (I) and 95–20, in particular 90–30, mol % of units of the formula (II), (III) or (IV), in particular adamantyl methacrylate.

Examples of such copolymers according to the invention are copolymers of 4-[(6-methacryloxyhexyl)methylamino]-4'-nitroazobenzene (=AZOC6MA) or 4-[(2-methacryloxyethyl)methylamino]-4'-nitroazobenzene (=AZOC2MA) and adamantyl methacrylate (=AdMA).

Preparation of admantyl methacrylate (AdMA)

A solution of 36.56 g (240 mmol) of adamantanol (e.g. from Fluka), 36.6 g (360 mmol) of triethylamine and 200 mg of hydroquinone in 930 g of methylene chloride was cooled to 0° C. under a nitrogen atmosphere.

37.40 g (360 mmol) of freshly distilled methacryloyl chloride in 93 g of methylene chloride were added dropwise to this, and the mixture was stirred at 0° C. for 2 hours. The solution was subsequently stirred at room temperature for 24 hours.

The solution was extracted three times with saturated aqueous NaHCO₃ solution and once with water, the methylene chloride was stripped off under reduced pressure, and the residue was dried under high vacuum to result in 60 g of crude product.

The latter was distilled under high vacuum with the addition of a stabilizer, resulting in 40 g of pure product.

EXAMPLE 1

Poly((adamantyl methacrylate)-co-{4-[(6-methacryloxyhexyl)methylamino]-4'-nitroazobenzene}) (molar ratio 90:10)

1.98 g (9 mmol) of adamantyl methacrylate, 0.42 g (1 mmol) of 4-[(6-methacryloxyhexyl)methylamino]-4'-nitroazobenzene, 22 g of chlorobenzene and 16.4 mg (0.1 mmol) of azodiisobutyronitrile (=AIBN) were introduced into a Schlenk tube. The solution was carefully degassed and then polymerized at 60° C. for 48 hours. For workup, the product was precipitated in methanol and reprecipitated three times from chloroform in methanol. Yield: 1.65 g (69%) of red polymer. GPC (=gel permeation chromatography) (PMMA calibration): $\overline{M}_w$: 136 400; $\overline{M}_n$: 66 000; $\overline{M}_w/\overline{M}_n = 2.1$

EXAMPLE 2

Poly((adamantyl methacrylate)-co-{4-[(6-methacryloxyhexyl)methylamino]-4'-nitroazobenzene}) (molar ratio 60:40)

1.32 g (6 mmol) of adamantyl methacrylate, 1.70 g (4 mmol) of 4-[(6-methacryloxyhexyl)methylamino]-4'-nitroazobenzene, 22 g of chlorobenzene and 24.6 mg (0.15 mmol) of AIBN were introduced into a Schlenk tube. The solution was carefully degassed and then polymerized at 60° C. for 48 hours. For workup, the product was precipitated in methanol and reprecipitated three times from chloroform in methanol.

Yield: 1.24 g (41%) of red polymer. GPC (PMMA calibration): $\overline{M}_w$: 108 800; $\overline{M}_n$: 42 100; $\overline{M}_w/\overline{M}_n = 2.58$.

The copolymers with the molar ratios 80:20 and 50:50 were prepared similarly.

Characterization of the polymers (90/10)–50/50) IR (film): 2911, 2853, 1722, 1601, 1587, 1516, 1379, 1337, 1310, 1155, 1138, 1103, 1053, 858, 756 cm⁻¹

¹H NMR (CDCl₃): δ=0.5–2.6 (m, br, aliph.-CH), 3.05 (br, N—CH₃), 3.4 (br, —NCH₂—), 3.95 (br, —OCH₂—), 6.6–6.8, 7.7–8.1, 8.1–8.4 (arom.-CH) ppm A summary of the polymerization mixtures and the compositions and properties of the resulting copolymers is given in Table 1.

TABLE 1

| Polymerization mixture: monomer ratio [mol %] | | Polymer composition [mol %][a] | | Yield (%) | Glass transition temperature (°C.)[b] |
|---|---|---|---|---|---|
| AdMA | AZOC6MA | PAdMA | PAZOC6MA | | |
| 90 | 10 | 92 | 8 | 68 | 211 |
| 80 | 20 | 83 | 17 | 57 | 177 |
| 60 | 40 | 66 | 34 | 41 | 118 |
| 50 | 50 | 57 | 43 | 47 | 105 |

[a] determined by ¹H-NMR spectroscopy
[b] determined by DSC (= differential scanning calorimetry using a Perkin Elmer DSC 7, heating rate: 10 K/min)

EXAMPLE 3

Poly((adamantyl methacrylate)-co-{4-[(2-methacryloxyethyl)ethylamino]-4'-nitroazobenzene}) (molar ratio 60/40)

1.32 g (6 mmol) of adamantyl methacrylate (AdMA), 1.53 g (4 mmol) of 4-{(2-methacryloxyethyl)ethylamino}-4'-nitroazobenzene (AZOC2MA), 33 g of chlorobenzene and 16.4 mg (0.1 mmol) of AIBN were introduced into a Schlenk tube. The solution was carefully degassed and then polymerized at 60° C. for 48 h. For workup, the product was precipitated in methanol and reprecipitated three times from chloroform in methanol.

Yield: 0.64 g (22.5%) Characterization of this polymer: IR (film): 2913, 2855, 1724, 1717, 1601, 1590, 1520, 1393, 1389, 1339, 1242, 1155, 1134, 1105, 1053, 853, 756 cm⁻¹

¹H-NMR (CDCl₃): δ=0.5–2.3 (m, br, aliph.-CH), 3.45 (br, —N—CH₂—CH₃), 3.60 (br, —N—CH₂—CH₂), 4.10 (br, —O—CH 2), 6.6–6.9, 7.65–7.95, 8.1–8.4 (aromat.-CH) ppm GPC (PMMA calibration): $\overline{M}_w$: 180 000; $\overline{M}_n$: 87 800; $\overline{M}_w/\overline{M}_n$: 2.05.

Copolymers were prepared correspondingly from AdMA and AZOC2MA in the molar ratios 70/30, 80/20 and 90/10. The results are to be found in Table 2.

TABLE 2

| Polymerization mixture: monomer ratio [mol %] | | Polymer composition [mol %][a] | | Yield (%) | Glass transition temperature (°C.)[b] |
|---|---|---|---|---|---|
| AdMA | AZO2MA | AdMA | AZOC6MA | | |
| 90 | 10 | 92 | 8 | 65 | 212 |
| 80 | 20 | 81 | 19 | 51 | 199 |
| 70 | 30 | 76 | 24 | 32 | 186 |

TABLE 2-continued

| Polymerization mixture: monomer ratio | | Polymer composition | | Yield (%) | Glass transition temperature (°C.)[b] |
|---|---|---|---|---|---|
| [mol %] AdMA | AZO2MA | [mol %][a] AdMA | AZOC6MA | | |
| 60 | 40 | 66 | 34 | 23 | 170 |

[a] determined by NMR spectroscopy
[b] determined by differential scanning calorimetry (DSC), heating rate: 10 K/min

We claim:

1. A copolymer with non-linear optical properties, comprising repeating units of the formula (I)

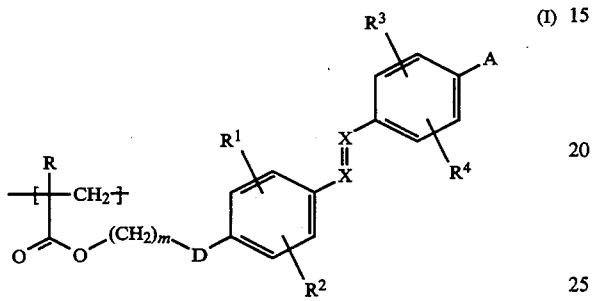

where
D is an electron donor,
A is an electron acceptor,
$R^1$, $R^2$, $R^3$ and $R^4$ can be the same as or different from one another, and are each H, alkyl of 1–6 carbons, cycloalkyl of 5 or 6 carbons, or $R^3$ and $R^4$ are each CN, $NO_2$, $SO_3CH_3$ or CHO, or $R^1$ forms with $R^2$, or $R^3$ forms with $R^4$, a fused-on ring,
X is CH and/or N,
m is an integer from 2 to 11, and
R is hydrogen or methyl,
and repeating units of at least one of the formulae (III) and (IV)

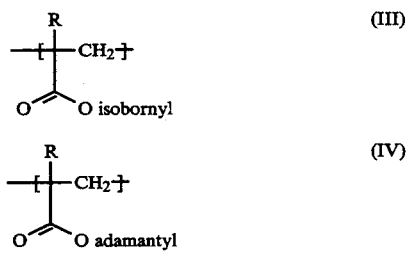

2. A copolymer as claimed in claim 1, wherein in formula (I)

D is $NR^5$ or O
—X=X— is —N=N—, —N=CH—, —CH=N— or —CH=CH—
A is H, $NO_2$, CN, CHO, $SO_3CH_3$,

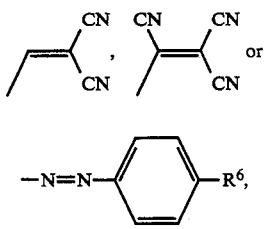

$R^5$ is $C_1$–$C_6$-alkyl, $C_5$–$C_7$-cycloalkyl, phenyl, benzyl, tolyl or a crosslinkable group and $R^6$ is H, $NO_2$, CN, $SO_3CH_3$ or CHO.

3. A copolymer as claimed in claim 2, wherein the crosslinkable group $R^5$ is vinyl, allyl, methallyl, methacryl, acryl, —$(CH_2)_n$—O—CO—CH=$CH_2$, —$(CH_2)_n$—O—CO—C($CH_3$)=$CH_2$ with n=1 to 8, oxiranyl or thiiranyl.

4. A copolymer as claimed in claim 3, which, besides the repeating units of the formulae (I), (III) or (IV), contains at least one other (meth)acrylate unit which is different from the formulae (I) to (IV) and may contain crosslinkable groups.

5. A copolymer as claimed in claim 2, which, besides the repeating units of the formulae (I), (III) or (IV), contains at least one other (meth)acrylate unit which is different from the formulae (I) to (IV) and may contain crosslinkable groups.

6. The copolymer of claim 2, wherein $R^5$ is $C_1$–$C_6$-alkenyl.

7. A copolymer as claimed in claim 1, which, besides the repeating units of the formulae (I), (III) or (IV), contains at least one other (meth)acrylate unit which is different from the formulae (I) to (IV) and may contain crosslinkable groups.

8. A copolymer as claimed in claim 1, which is composed of 5–80 mol % of units of the formula (I) and of 20–95 mol % of units of the formulae (III) or (Iv).

* * * * *

UNITED STATES PATENT AND TRADEMARK OFFICE
CERTIFICATE OF CORRECTION

PATENT NO.: 5,384,378

DATED: January 24, 1995

INVENTOR(S): ETZBACH et al.

It is certified that error appears in the above-identified patent and that said Letters Patent is hereby corrected as shown below:

Column 10, claim 3, line 31, "n-1" should be --n=1--.

Column 10, claim 4, line 36, "(I) to (IV)" should be --(I), (III) or (IV)--.

Column 10, claim 5, line 41, "(I) to (IV)" should be --(I), (III) or (IV)--.

Column 10, claim 7, line 48, "(I) to (IV)" should be --(I), (III) or (IV)--.

Signed and Sealed this

Second Day of May, 1995

*Attest:*

BRUCE LEHMAN

*Attesting Officer*          *Commissioner of Patents and Trademarks*